US005395925A

United States Patent [19]

Koch et al.

[11] Patent Number: 5,395,925

[45] Date of Patent: Mar. 7, 1995

[54] ASYMMETRIC SULFO GROUP-CONTAINING DISAZO COMPOUNDS CONTAINING TWO 6-HALO-1,3,5-TRIAZINYL GROUPS

[75] Inventors: Werner Koch, Oberwil, Switzerland; Kurt Brenneisen, Grenzach-Wyhlen, Germany

[73] Assignee: Sandoz Ltd., Basle, Switzerland

[21] Appl. No.: 30,929

[22] Filed: Mar. 12, 1993

Related U.S. Application Data

[63] Continuation of Ser. No. 483,146, Feb. 21, 1990, abandoned, which is a continuation of Ser. No. 160,954, Feb. 26, 1988, abandoned, which is a continuation of Ser. No. 916,910, Oct. 9, 1986, abandoned, which is a continuation-in-part of Ser. No. 503,320, Jun. 10, 1983, abandoned, which is a continuation of Ser. No. 306,881, Sep. 30, 1981, abandoned.

[30] Foreign Application Priority Data

Oct. 7, 1980 [GB] United Kingdom ................. 8032278

[51] Int. Cl.[6] ...................... C09B 62/09; C09B 67/22; D06P 1/382

[52] U.S. Cl. ........................................ 534/634; 8/549

[58] Field of Search ..................... 534/624, 634; 8/549

[56] References Cited

U.S. PATENT DOCUMENTS

| | | | |
|---|---|---|---|
| 3,118,869 | 1/1964 | Berrie et al. | 534/634 X |
| 3,226,176 | 12/1965 | Hindermann et al. | 534/634 X |
| 3,646,002 | 2/1972 | Andrew et al. | 534/634 X |
| 3,647,778 | 3/1972 | Andrew et al. | 534/634 X |
| 4,082,739 | 4/1978 | Seitz | 534/634 X |
| 4,148,790 | 4/1979 | Sueda et al. | 534/634 X |
| 4,228,071 | 10/1980 | Riat et al. | 534/634 X |
| 4,323,497 | 4/1982 | Hoyer et al. | 534/634 X |
| 4,502,866 | 3/1985 | Brenneisen et al. | 534/624 X |
| 5,032,142 | 7/1991 | Egger et al. | 8/549 |

FOREIGN PATENT DOCUMENTS

| | | | |
|---|---|---|---|
| 2611550 | 9/1976 | Germany | 534/634 |
| 51-147688 | 12/1976 | Japan | 534/634 |
| 785222 | 10/1957 | United Kingdom | 534/634 |
| 854432 | 11/1960 | United Kingdom | 534/634 |
| 1405016 | 9/1975 | United Kingdom | 534/634 |
| 1461125 | 5/1977 | United Kingdom | 534/634 |
| 2008144 | 5/1977 | United Kingdom | 534/634 |

OTHER PUBLICATIONS

English translation of JP 51-147688 Imahori et al.

*Primary Examiner*—Mary C. Lee
*Assistant Examiner*—Fiona T. Powers
*Attorney, Agent, or Firm*—Robert S. Honor; Melvyn M. Kassenoff

[57] ABSTRACT

Compounds of the formula

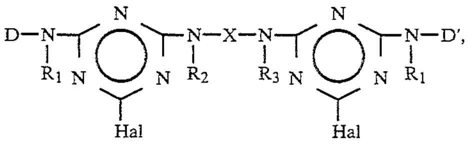

wherein

D is the residue of a metal-free azo dye free of fiber-reactive groups and containing 2 to 4 sulfo groups, D' is the residue of a metal-free azo dye free of fiber-reactive groups and containing 2 to 4 sulfo groups, with the proviso that D and D' are different, each $R_1$ is independently hydrogen or $C_{1-4}$alkyl, each of $R_2$ and $R_3$ is independently hydrogen, $C_{1-4}$-alkyl or 2-, 3- or 4-hydroxy($C_{2-4}$alkyl), X is linear or branched $C_{2-10}$alkylene or linear or branched $C_{3-10}$alkylene monosubstituted or disubstituted by hydroxy which optionally contains one or two radicals selected from —O— and —NRa—, wherein Ra is hydrogen or $C_{1-4}$alkyl, and each Hal is fluoro, chloro or bromo, which compounds are in free acid or salt form, and mixtures thereof, which compounds and mixtures are useful as fiber-reactive dyes for dyeing and printing hydroxy group- and/or nitrogen-containing organic substrates, for example, leather and textiles containing or consisting of natural or synthetic polyamides such as wool, silk and nylon and natural or regenerated cellulose such as cotton, viscose and spun rayon.

20 Claims, No Drawings

ASYMMETRIC SULFO GROUP-CONTAINING DISAZO COMPOUNDS CONTAINING TWO 6-HALO-1,3,5-TRIAZINYL GROUPS

This is a continuation of application Ser. No. 07/483,146, filed Feb. 21, 1990, now abandoned, which in turn is a continuation of application Ser. No. 07/160,954, filed Feb. 26, 1988, now abandoned, which in turn is a continuation of application Ser. No. 06/916,910, filed Oct. 8, 1986, now abandoned, which turn is a continuation-in-part of application Ser. No. 06/503,320, filed Jun. 10, 1983, now abandoned, which in turn is a continuation of application Ser. No. 06/306,881, filed Sep. 30, 1981, now abandoned.

The present invention relates to halotriazinyl-containing compounds, their production and use as fibre-reactive dyestuffs.

More particularly, the present invention provides asymmetric compounds of formula I,

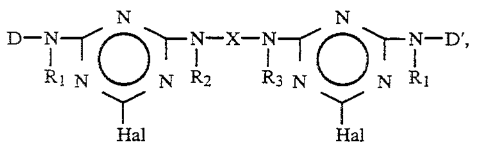

in which D is the residue of a metal-free azo dye free of fibre-reactive groups and containing 2 to 4 sulpho groups, D' has one of the significances of D, with the proviso that D and D' are different, each $R_1$ is independently hydrogen or $C_{1-4}$alkyl, each of $R_2$ and $R_3$ is independently hydrogen, $C_{1-4}$-alkyl or 2-, 3- or 4-hydroxy($C_{2-4}$alkyl), X is a monohydroxy- or dihydroxy-substituted straight chain or branched chain $C_{3-10}$-alkylene radical which optionally contains one or two hetero atom-linkages selected from —O— and

or is a $C_{2-10}$ straight or branched chain alkylene radical,

Ra is hydrogen or $C_{1-4}$alkyl, and each Hal is fluorine, chlorine or bromine, which compounds are in free acid or salt form, and mixtures thereof.

Examples of residues of monoazo dyestuffs are those which contain components of the aromatic carbocyclic series and heterocyclic series, such as the naphthalene, benzene, pyrazolone and pyridone series. Preferred dyestuff residues are of the formulae Np—N=N—Ar—, Np—N=N—Np—, Ar—N=N—Np— and Het—N=N—Ar—, wherein Np is a radical of the naphthalene series, Ar is a radical of the benzene series and Het is a radical of the heterocyclic series and such residues contain 2 to 4 sulpho groups.

More preferred residues are those of formulae (a), (b), (c), (d), (e), (f) and (g)

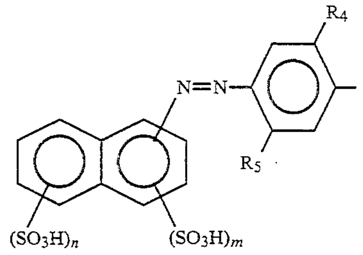

(a)

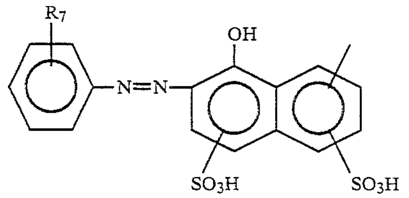

(b)

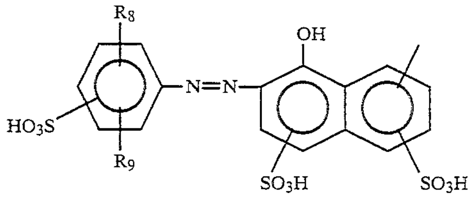

(c)

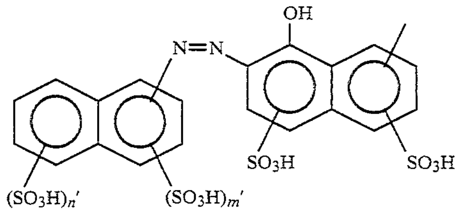

(d)

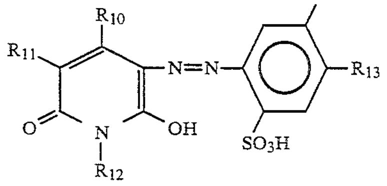

(e)

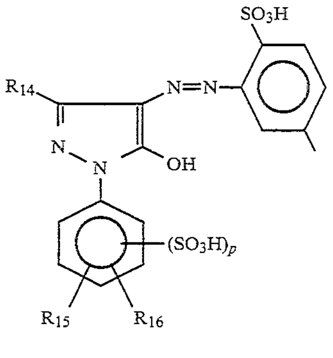

(f)

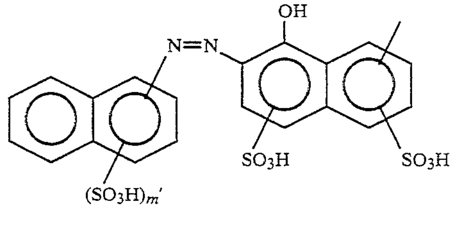

(g)

in which $R_4$ is hydrogen, $C_{1-4}$alkyl or $C_{1-4}$alkoxy, $R_5$ is hydrogen, $C_{1-4}$alkyl, $C_{1-4}$alkoxy or —$NHCOR_6$ where $R_6$ is $C_{1-4}$alkyl, —$NH_2$, —$NHC_{1-4}$alkyl or —$N(C_{1-4}alkyl)_2$, $R_7$ is hydrogen or $C_{1-4}$alkyl, $R_8$ is hydrogen or $C_{1-4}$alkyl, $R_9$ is hydrogen or sulpho, $R_{10}$ is hydrogen, $C_{1-4}$alkyl, carboxy, phenyl or sulphomethyl, $R_{11}$ is hydrogen, carboxy, sulpho, sulphomethyl or —$CONH_2$, with the proviso that when $R_{10}$ is sulphomethyl, $R_{11}$ is other than sulpho and sulphomethyl, $R_{12}$ is hydrogen, $C_{1-4}$alkyl or phenyl, $R_{13}$ is hydrogen or sulpho, with the proviso that radical (e) contains at least two sulpho groups, $R_{14}$ is $C_{1-4}$alkyl or carboxy, each of $R_{15}$ and $R_{16}$, independently, is hydrogen $C_{1-4}$alkyl, chlorine or bromine, each of m and m' is independently 0 or 1, each of n and n' is independently 1 or 2, with the provisos that the sum of m+n is 2 or 3 and the sum of m' and n' is 2, and p is 2.

The hydroxy-substituted alkylene bridge as X preferably contains 3 to 6 carbon atoms and is preferably monohydroxy-substituted. When such alkylene as X contains hetero linkages such as —O— or —$N(C_{1-4}alkyl)$—, such hetero linkages are separated from the —$NR_2$— and —$NR_3$—groups, the hydroxy groups and from each other by at least two carbon atoms. The unsubstituted alkylene bridge as X preferably contains 2to 6 carbon atoms, most preferably 3 carbon atoms.

X is preferably X' where X' is straight chain or branched chain $C_{2-6}$alkylene or a monohydroxy-substituted straight or branched chain $C_{3-6}$alkylene. When X is a monohydroxy-substituted alkylene radical, it is preferably X", where X" is a monohydroxy-substituted straight or branched chain $C_{3-6}$alkylene and more preferably, X''', where X''' is $$-CH_2-\underset{\displaystyle OH}{\underset{|}{CH}}-CH_2- \text{ or } -\underset{\displaystyle CH_2OH}{\underset{|}{CH}}-CH_2-.$$

Most preferably, X is —$CH_2CH_2$—.

Hal is preferably fluorine or chlorine, more preferably chlorine.

Any alkyl as $R_1$, $R_2$, $R_3$, $R_4$, $R_5$, $R_6$, $R_7$, $R_8$, $R_{10}$, $R_{12}$, $R_{14}$, $R_{15}$ and $R_{16}$ preferably contains 1 or 2 carbon atoms.

Any alkoxy as $R_4$ or $R_5$ preferably contains 1 or 2 carbon atoms and is especially methoxy.

Each $R_1$, independently, is preferably $R_1'$, where $R_1'$ is hydrogen, methyl or ethyl; more preferably $R_1$ is $R_1''$, where $R_1''$ is hydrogen or methyl,with hydrogen being especially preferred.

Each of $R_2$ and $R_3$ is preferably $R_2'$ and $R_3'$, where each of $R_2'$ and $R_3'$, independently, is hydrogen, methyl, ethyl or hydroxyethyl. More preferably $R_2$ and $R_3$ are $R_2''$ and $R_3''$, where each of $R_2''$ and $R_3''$, independently, is hydrogen or methyl, with hydrogen being most preferred.

$R_4$ is preferably $R_4'$, where $R_4'$ is hydrogen methyl or methoxy.

$R_5$ is preferably $R_5'$, where $R_5'$ is hydrogen methyl or —$NHCOR_6'$, where $R_6'$ is methyl, ethyl, —$NH_2$, —$NHC_{1-2}$alkyl or —$N(C_{1-2}alkyl)_2$. More preferably $R_5$ is $R_5''$, where $R_5''$ is hydrogen, methyl or —$NHCOR_6''$, where $R_6''$ is methyl, ethyl or —$NH_2$, especially methyl or —$NH_2$.

When $R_5$ is —$NHCOR_6$, $R_4$ is preferably hydrogen, and when $R_5$ is $C_{1-4}$alkyl, especially methyl, $R_4$ is preferably hydrogen or methoxy. When $R_5$ is hydrogen, $R_4$ is preferably hydrogen.

$R_7$ is preferably hydrogen.

$R_8$ is preferably $R_8'$, where $R_8'$ is hydrogen, methyl or ethyl.

$R_{10}$ is preferably $R_{10}'$, where $R_{10}'$ is hydrogen or $C_{1-2}$-alkyl, with methyl being most preferred.

$R_{11}$ is preferably $R_{11}'$ where $R_{11}'$ is hydrogen, sulphomethyl or —$CONH_2$.

$R_{12}$ is preferably $R_{12}'$, where $R_{12}'$ is hydrogen or $C_{1-2}$-alkyl, with ethyl being especially preferred.

$R_{13}$ is preferably hydrogen when $R_{11}$ is sulphomethyl and is sulpho when $R_{10}$ is $R_{10}'$ and $R_{11}$ is hydrogen or —$CONH_2$.

$R_{14}$ is preferably $R_{14}'$, where $R_{14}'$ is methyl or carboxy with carboxy being most preferred.

$R_{15}$ and $R_{16}$ are preferably $R_{15}'$ and $R_{16}'$, where each of $R_{15}'$ and $R_{16}'$, independently, is hydrogen, methyl or chlorine p is preferably 1.

In the residues of formula (a) the azo group is bound to the 1- or 2-position, preferably the 2-position.

In the radicals of formula (a) when the azo group is bound to the 2-position and when n is 2 and m is 1 the sulpho groups are in the 3,6,8-, 4,6,8-, 1,5,7- or 3,5,7-positions, preferably in the 3,6,8- or 4,6,8-positions. When the azo group is in the 1-position the sulpho groups are preferably in the 2,5,7- or 3,6,8-positions.

In the radicals of formula (a) when n is 1 and m is 1 the azo group is preferably in the 2-position, and the sulpho groups are preferably in the 1,5-, 1,6- or 4,8-positions, and when n is 2 and m is 0 they are preferably in the 6,8-positions.

In the radicals of formula (d) each of m' and n' is preferably 1; more preferably, the azo group is in the 2-position, and the sulpho groups are in the 1,5- or 1,6-positions.

In the radicals of formulae(b), (c) and (d) the sulpho groups on the hydroxynaphthalene group are preferably in the 3-and 6-positions.

In the radical of formula (g), preferably the azo group is in the 2-position and the sulpho group in the 1-position.

In the radicals of formula (c), preferably one of $R_8$, $R_9$ and the sulpho group is in the 2-position; more preferably the sulpho group is in the 2-position.

Preferably only one of D and D' signifies a residue containing a heterocyclic group.

Preferred compounds of formula I are those (i) in which D is a radical of formula (a) in which m is 1 and n is 1 or 2 or m is 0 and n is 2, $R_4$ is hydrogen and $R_5$ is —$NHCOR_6$, Hal is chlorine, $R_2$ and $R_3$ are $R_2'$ and $R_3'$ and D' is a radical of formula (a) in which m is 1 and n is 1 or 2, $R_4$ is $R_4'$, $R_5$ is $R_5'$ other than —$NHCOR_6$, and X is X', preferably X";

(ii) in which D is a radical of formula (a) in which m is 1 and n is 2, $R_2$ and $R_3$ are $R_2'$ and $R_3'$, $R_4$ is hydrogen and $R_5$ is —$NHCOR_6$, Hal is chlorine and D' is a radical of formula (a) in which m is 1 and n is 1 and $R_4$ is $R_4'$, $R_5$ is $R_5'$, and X is X', preferably X";

(iii) in which D is a radical of formula (a) in which m is 1 and n is 2, $R_2$ and $R_3$ are $R_2'$ and $R_3'$, $R_4$ is $R_4'$ and $R_5$ is $R_5'$, Hal is chlorine, D' is a radical of formula (b) or (c) in which $R_7$ is hydrogen and $R_8$ is $R_8'$, and X is X' preferably X'';

(iv) those in which D is a radical of formula (a) in which m is 1 and n is 1 or 2 or, m is 0 and n is 2, $R_2$ and $R_3$ are $R_2'$ and $R_3'$, $R_4$ is $R_4'$ and $R_5$ is $R_5'$, Hal is chlorine and D' is a radical of formula (b) or (c) in which $R_7$ is hydrogen and $R_8$ is $R_8'$, and X is X' preferably X'';

(v) those in which D is a radical of formula (d) in which each of m' and n' is 1, $R_2$ and $R_3$ are $R_2'$ and $R_3'$, D' is a radical of formula (a) in which n is 1 and m is 1 or n is 2 and m is 0, preferably the latter, $R_4$ is hydrogen and $R_5$ is —$NHCOR_6$, Hal is chlorine, and X is X', preferably X'';

(vi) those in which D is a radical of formula (e) in which $R_{10}$ is $R_{10}'$, $R_{11}$ is $R_{11}'$ and $R_{12}$ is $R_{12}'$, $R_2$ and $R_3$ are $R_2'$ and $R_3'$, D' is a radical of formula (b) or (c), in which $R_7$ is hydrogen and $R_8$ is $R_8'$, Hal is chlorine, and X is X' preferably X'';

(vii) those in which D is a radical of formula (f) in which $R_{14}$ is $R_{14}'$ and $R_{15}$ is $R_{15}'$, $R_{16}$ is $R_{16}'$ and p is 1 $R_2$ and $R_3$ are $R_2'$ and $R_3'$ and D' is a radical of formula (b) or (c), in which $R_7$ is hydrogen and $R_8$ is $R_8'$ Hal is chlorine, and X is X' preferably X'';

(viii) those in which D is a radical of formula (g), $R_2$ and $R_3$ are $R_2'$ and $R_3'$, D' is a radical of formula (d) in which each of m' and n' is 1 or of formula (c) in which $R_8$ is $R_8'$, Hal is chlorine and X is X';

(ix) those in which D is a radical of formula (c) in which $R_8$ and $R_9$ are hydrogen, $R_2$ and $R_3$ are $R_2'$ and $R_3'$, D' is a radical of formula (d) in which each of m' and n' is 1, Hal is chlorine, and X is X';

(x) those of (i) to (ix) in which X is X''';

(xi) those of (i) to (ix) in which X is —$CH_2CH_2$—;

(xii) those of (i) to (xi) in which $R_1$, $R_2$ and $R_3$ are hydrogen;

(xiii) those wherein D and D' are different groups of formulae (a), (b), (c), (d), (e), (f) and (g);

(xiv) those of (xiii) wherein X is X';

(xv) those of (xiv) wherein X is X'';

(xvi) those of (xiv) wherein X is linear or branched $C_{2-6}$-alkylene;

(xvii) those of (xiii) wherein $R_2$ is $R_2'$, and $R_3$ is $R_3'$;

(xviii) those of (xiii) wherein $R_4$ is $R_4'$, and $R_5$ is $R_5'$;

(xix) those of (xiii) wherein $R_4$ is hydrogen when $R_5$ is hydrogen or —$NHCOR_6$ and is hydrogen or methoxy when $R_5$ is $C_{1-4}$alkyl;

(xx) those of (xiii) wherein $R_7$ is hydrogen and $R_8$ is $R_8'$;

(xxi) those of (xiii) wherein $R_{10}$ is $R_{10}'$, $R_{11}$ is $R_{11}'$, $R_{13}$ is hydrogen or sulfo, with the proviso that $R_{13}$ is hydrogen when $R_{11}$ is sulfomethyl and is sulfo when $R_{11}$ is hydrogen or —$CONH_2$ $R_{14}$ is $R_{14}'$, $R_{15}$ is $R_{15}'$, $R_{16}$ is $R_{16}'$ and p is 1;

(xxii) those of (xiii) wherein $R_1$, $R_2$ and $R_3$ are hydrogen; and (xxiii) those of (xxii) wherein each Hal is chloro.

The cations of the sulpho groups when the compounds of formula I are in salt form may be any of those non-chromophoric cations common in the chemistry of reactive dyestuffs. Examples of suitable cations are alkali metal cations and substituted or unsubstituted ammonium, such as sodium, lithium, potassium, ammonium, mono-, di- and tetramethylammonium, triethylammonium and mono-, di- and triethanolammonium.

The present invention further provides a process for the production of compounds of formula I, as defined above, comprising condensing a compound of formula II

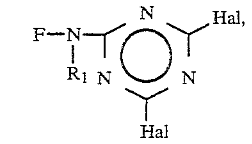

in which F is D or D', with a compound of formula III

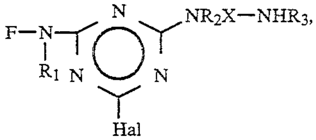

in which $F_1$ is D' when F is D or is D when F' is D'.

The reaction is carried out in accordance with known methods. Suitably the reaction is effected in a neutral to alkaline medium in the presence of an acid binding agent. The reaction temperature is preferably in the range of 30° to 60 ° C.

The compounds of formulae II and III may be prepared in accordance with known methods. The compounds of formula III are preferably prepared by reacting the dyestuff $F_1$—$NHR_1$ with 2,4,6-trihalo-1,3,5-triazine, optionally in the presence of an acid binding agent, at 0°–5° C. in a weakly acid medium, i.e. pH 4–6.5, and then reacting the product with $HNR_2$—X—$NR_3H$. The second reaction is suitably carried out from room temperature to 50° C. in a neutral medium advantageously in the presence of an acid binding agent.

The compounds of formula I and mixtures thereof are useful as reactive dyestuffs for dyeing or printing hydroxy-group nitrogen-containing organic substrates. Preferred substrates are leather and textiles comprising or consisting of natural or synthetic polyamides such as wool, silk and nylon, natural or regenerated cellulose such as cotton, viscose and spun rayon. When Hal is chlorine dyeing may be effected equally well at 80° C. as at 100° C. When Hal is fluorine the dyestuffs are so called cold dyes, i.e., dyeing is preferably effected at temperatures in the range of between 30° and 50° C.

Dyeing is effected in accordance with known methods. Preferably, dyeing is effected by the exhaust method. Furthermore, dyeing may also be carried out using the Pad-Batch process.

The dyeings and prints obtained have good fastness properties, especially good light and wet fastnesses such as wash, water, sea water and sweat fastness. They show notable resistance to hydrolysis in the presence of perborate. Furthermore, the dyeings and prints are stable to any oxidative influences, e.g., stable to chlorinated water, hypochlorite- or peroxide-bleach or perborate containing wash liquors. The compounds according to the invention have good water-solubility in the presence of salt, they are only very slightly affected by salts. They migrate well and give even, unmottled dyeings. In view of their good build-up power the compounds of formula I give high exhaust and fixation yields. The portion of unfixed dye can be easily washed off the substrate.

The compounds of formula I are well compatible with other reactive dyes. They may be applied per se or in combination with appropriate fibre-reactive dyes of the same class having analogous dyeing properties such as common fastness properties, extent of ability to exhaust from the dyebath onto the fibre, etc. The dyeings obtained with such combination mixtures have good fastness properties and are comparable to those obtained with a single dye.

The following examples further serve to illustrate the invention. In the examples all parts and percentages are by weight or volume, and the temperatures are in degrees Centigrade.

EXAMPLE 1

191.5 Parts 2-aminonaphthalene-3,6,8-trisulphonic acid are suspended in 500 parts water. After the addition of 125 parts 30% hydrochloric acid with the addition of ice to cool to 0° to 6°, diazotization is carried out over a period of 45 minutes with 125 parts 4N sodium nitrite solution. Stirring is effected for 1 hour and any excess nitrite is decomposed with sulphamic acid.

75.5 Parts 1-amino-3-ureidobenzene are dissolved in 250 parts water with the addition of 50 parts 30% hydrochloric acid and cooling to a temperature under 5° with ice. The diazo suspension obtained as described above is slowly added thereto with simultaneous addition of 100 parts sodium acetate (crystalline), portionwise. The solution is stirred overnight and then adjusted to pH 4.5 with a little 20% soda solution and salted out with approximately 10 mol % sodium chloride. The dye is filtered off.

At approximately 2°, 50 parts cyanuric chloride are added to a solution of the dyestuff so obtained in 800 parts water, the pH of the solution being adjusted to 5 to 5.5. Stirring is effected at a temperature not exceeding 5°. Subsequently, 42 parts cyanuric chloride are added, and the pH is adjusted to approximately 5.5 with sodium carbonate solution. After completion of the condensation the reaction mixture is treated with activated charcoal and then filtered clear.

37 Parts 1,3-diaminopropanol-2 in 600 parts water are added to the so-obtained dyestuff solution which is stirred overnight at room temperature, the mixture is adjusted to pH 7 and the whole is stirred at 30°–40° C. for approximately a further 6 hours. The product is salted out with sodium chloride and filtered.

Meanwhile 285 parts of the trisodium salt of 8-amino-1-hydroxy-2-(2'-sulphophenylazo)naphthalene-3,6-disulphonic acid in 800 parts water is reacted with 92 parts cyanuric chloride at 0°–5°. The pH of the solution is adjusted to 4 to 4.5 by the addition of aqueous sodium carbonate solution.

The product obtained thereby is reacted with the condensation product with 1,3-diaminopropanol-2 obtained as described above by stirring at room temperature overnight followed by stirring for approximately 6 hours at a temperature of from 40° to 50° C., the pH having being adjusted to 7. After salting out with sodium chloride, filtering and drying in vacuo at approximately 80°, the dyestuff of the formula

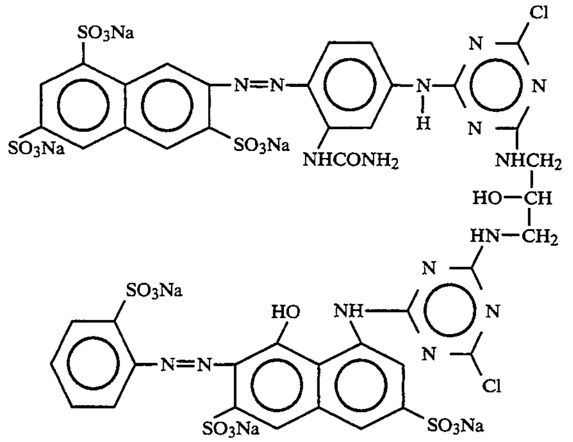

is obtained, which dyes natural and regenerated cellulose in scarlet shades.

EXAMPLE 2

6.9 Parts dichlorotriazine monoazo dyestuff obtained by acid coupling of diazotized 2-aminonaphthalene-3,6,8-trisulphonic acid with m-aminophenylurea and subsequent condensation with cyanuric chloride are dissolved in 70 parts water made neutral and reacted at room temperature with a solution consisting of 0.8 parts 1,2-diaminopropane in 8 parts water and 2 parts 30% hydrochloric acid. The mixture is reacted for 5 hours at a pH of 7 to 8and a temperature of 25°–35° C. The pH is maintained by the addition of c. 1 part calcined soda dissolved in a little water. After the reaction is ended the completely formed precipitated amino dye is filtered to separate out the by-products. The presscake is stirred into 70 parts water at room temperature and then combined with the aqueous solution of approximately 70 parts by volume containing 5 parts of the dyestuff obtained as follows:

4 Parts of the dye obtained by acid coupling of diazotized 2-aminonaphthalene-4,8-disulphonic acid with 2-amino-1-methoxy-4-methylbenzene are dissolved in 50 parts water and made neutral and then reacted with 1.8 parts cyanuric chloride with vigorous stirring, the pH of approximately 5 at 20° to 25° C. being maintained by the addition of aqueous soda solution. After completion of the reaction the solid colourless impurities are filtered off whereby the solution is ready for use. The connection of the two monoazo dyes is effected over 5 hours at 20° to 30° C. whereby the pH is held at 11 to 11.5 by continuous addition of sodium hydroxide solution. After completion of the reaction in a neutral pH medium the disazo dyestuff is precipitated with the help of sodium chloride and is then filtered. After drying and grinding, an orange powder is obtained which dyes cotton and regenerated cellulose fibres in lively golden-yellow shades. The product, in free acid form, is of the formula

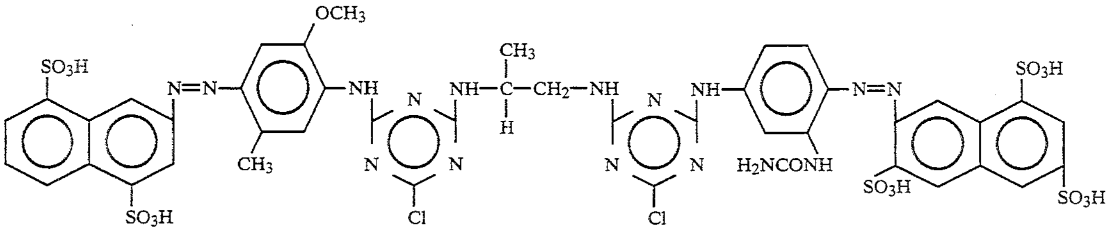

EXAMPLE 3 a) 159.5 Parts of 1-amino-8-hydroxynaphthalene-3,6-disulphonic acid in 900 parts of water are reacted at 0–5° with 92 parts of cyanuric chloride whilst maintaining a pH of 3–4 by the addition of aqueous sodium carbonate solution. Within four to five hours, the condensation is completed. The reaction mixture thus obtained is divided into two equal parts, and both parts are further processed separately.

b) 45.4 Parts of 1-aminobenzene-2-sulphonic acid are suspended in 125 parts of water and 150 parts of ice with the addition of 28.7 parts of a 30% hydrochloric acid while stirring. Diazotization is effected by adding 18.1 parts of sodium nitrite as a 4N aqueous solution during 20 minutes. Any excess nitrite is decomposed with a small amount of sulphamic acid. This cold, yellow diazo suspension is added to the first part of the condensation product obtained under a). Coupling is effected at 5–8° by the addition of a 15% aqueous sodium carbonate solution while stirring. The sodium carbonate solution is added at such a rate as to permit the pH increase to 7 within 45 minutes.

Subsequently, to this coupling mixture a solution prepared from 15 parts of ethylene diamine and 57 parts of 30% hydrochloric acid and 100 parts of ice are added. This reaction mixture is heated to 40°, and the pH is kept at 6.5 by adding aqueous sodium carbonate solution. After one hour, the selective condensation (the reaction of only one amino group of the diamine with one chlorine of the dichlorotriazinyl group) is complete.

c) In the meantime, the second diazo component has been prepared in analogous manner as described under b), using 79.5 parts of 2-aminonaphthalene-1,5-disulphonic acid and 18.1 parts of sodium nitrite in 34.5 parts of 30% hydrochloric acid. The diazo solution in added to the second part of the condensation product obtained under a). Coupling is effected in analogous manner as described under b). A dark-red suspension is obtained where the dyestuff has precipitated approximately completely.

This suspension is added to the solution of the condensation product obtained under b) with stirring. Condensation is effected at 40° and pH 8 by adding aqueous sodium carbonate solution to obtain the dyestuff of the formula

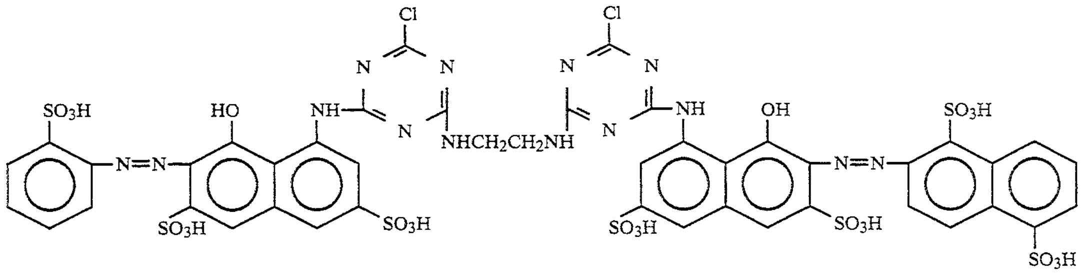

The dyestuff is isolated by salting out with a mixture of potassium- and sodium-chloride, filtered and dried in vacuo. It is obtained in form of a mixed potassium-/sodium-salt, and dyes natural or regenerated cellulose a brilliant bluish-red shade.

EXAMPLE 4

When in step b) of Example 3,.58.5 parts of 2-aminonaphthalene-1-sulphonic acid are used instead of 45.4 parts of 1-aminobenzene-2-sulphonic acid, the corresponding disazo-dyestuff of the formula

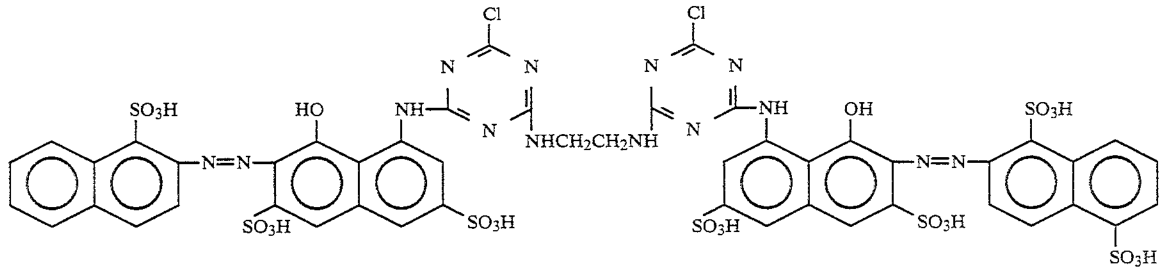

is obtained which dyes natural or regenerated cellulose a bluish-red shade.

In analogy with the method described in Examples 1 to 4 further dyestuffs, given in the following Table, may be prepared. The dyestuffs are obtained in the sodium- and mixed sodium-/potassium-salt form, respectively. However, they may be converted to other salt forms in accordance with known methods. In Examples 5 to 21, $R_2$ and $R_3$ are hydrogen. In Examples 22 to 54, Hal is chlorine. In the last column DS of the Table the dye shade on cellulose is given, where a is golden-yellow, b is scarlet, c is reddish-yellow, and d is bluish-red.

TABLE
| Ex. No. | D—NR1— | Hal | D'—NR1— | X | DS |
|---|---|---|---|---|---|
| 5 | 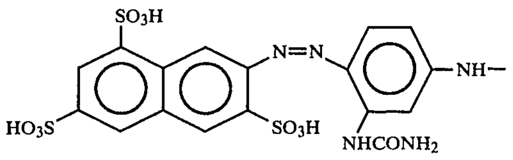 | Cl | 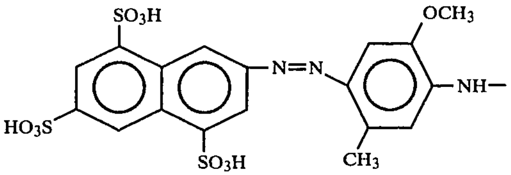 | $-CH_2-\underset{OH}{\underset{\vert}{CH}}-CH_2-$ | a |
| 6 | " | " | 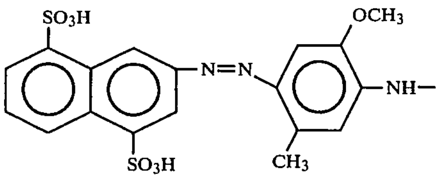 | " | a |
| 7 | 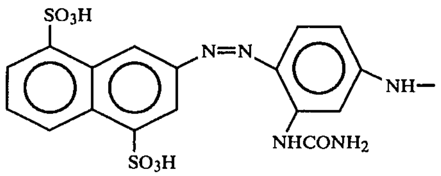 | " | 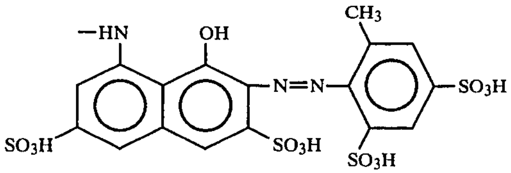 | " | b |
| 8 | 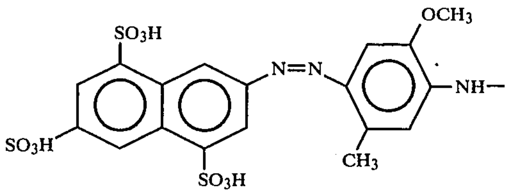 | " | 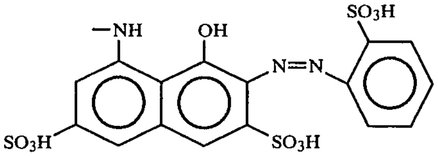 | " | b |
| 9 | 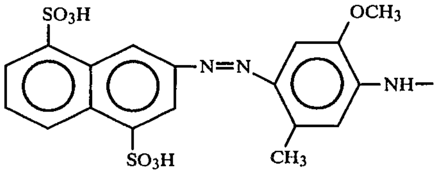 | " | 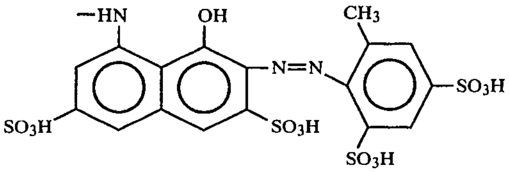 | " | b |

TABLE-continued
| | | | | | |
|---|---|---|---|---|---|
| 10 | 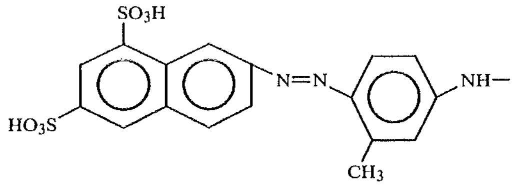 | " | 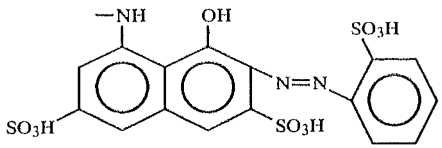 | " | b |
| 11 | 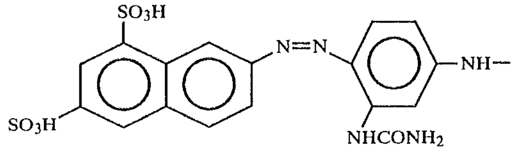 | Cl | 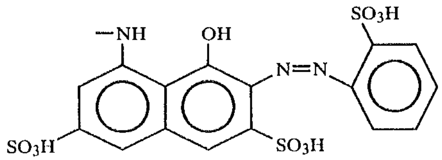 | 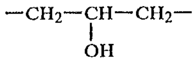 | b |
| 12 | 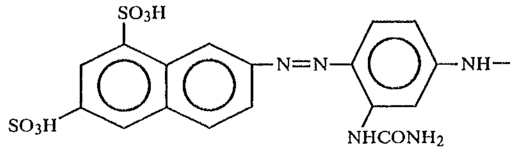 | " | 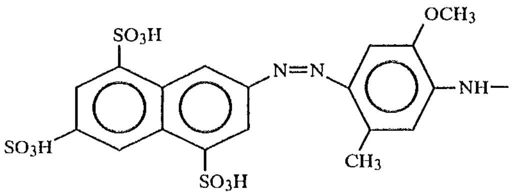 | " | a |
| 13 | " | F | " | " | a |
| 14 | " | " | " | 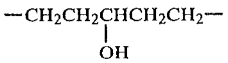 | |
| 15 | " | " | " | 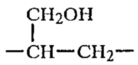 | a |
| 16 | 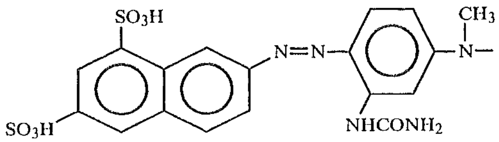 | " | " | 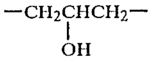 | a |
| 17 | 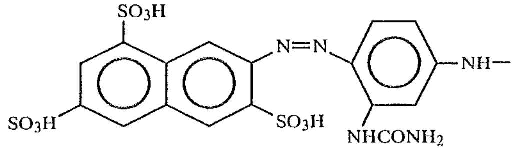 | " | 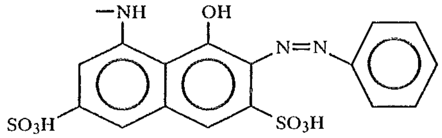 | " | b |

TABLE-continued
| Ex. No. | D—NR1— | | D'—NR1— | $-N(R_2)-X-N(R_3)-$ | DS |
|---|---|---|---|---|---|
| 18 | 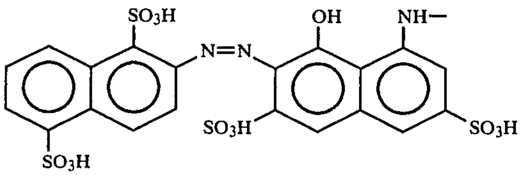 | Cl | 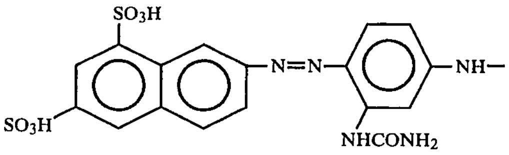 | $-CH_2CH(OH)CH_2-$ | b |
| 19 | 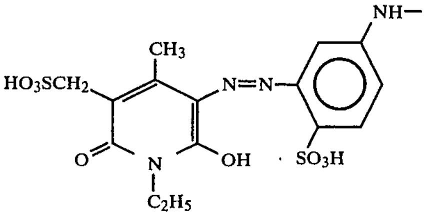 | Cl | 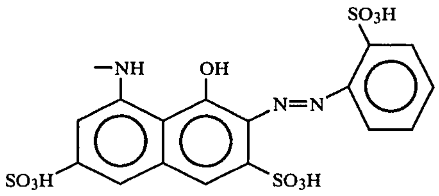 | " | b |
| 20 | 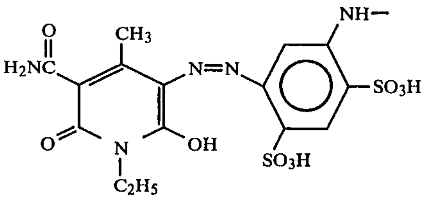 | Cl | " | " | b |
| 21 | 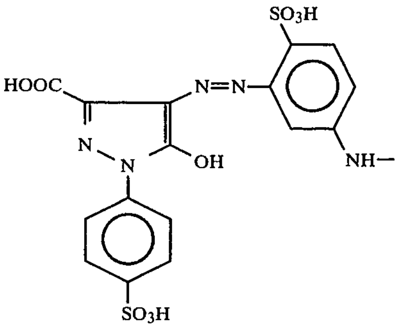 | Cl | " | " | b |

TABLE-continued
| | | | | |
|---|---|---|---|---|
| 22 | 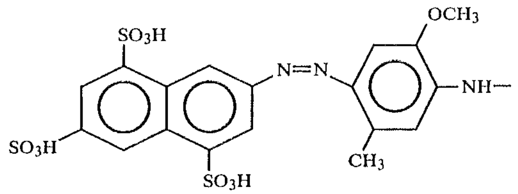 | 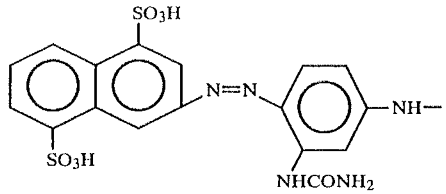 | $CH_3$<br>$-NH-CH-CH_2-NH-$ | a |
| 23 | " | 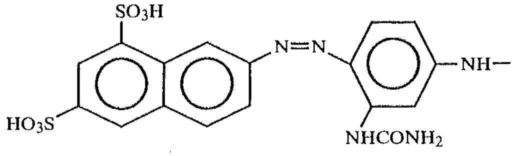 | " | a |
| 24 | 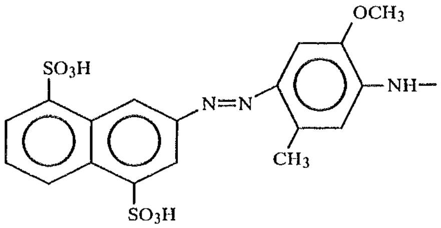 | 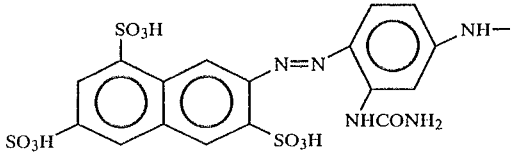 | $-NH-CH_2CH_2CH_2-NH-$ | a |
| 25 | " | " | $-NHCH_2CH_2NH-$ | a |
| 26 | " | " | $-N-CH_2CH_2-NH-$<br>$CH_2CH_2OH$ | a |
| 27 | 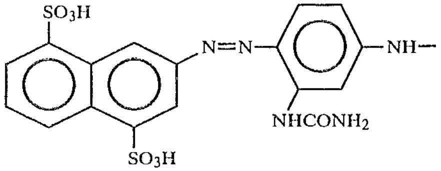 | " | $-NH-CH_2-CH-CH_2NH-$<br>$OH$ | a |

TABLE-continued
| | | | | |
|---|---|---|---|---|
| 28 | 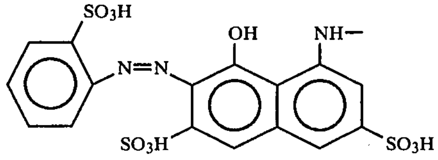 | 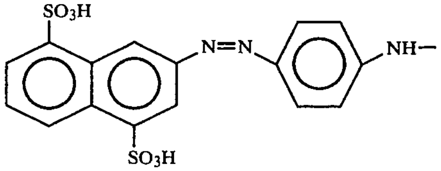 | $-NH-CH_2-\underset{\displaystyle OH}{\underset{|}{CH}}-CH_2-NH-$ | b |
| 29 | " | 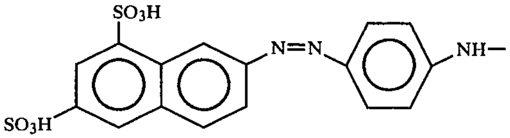 | " | b |
| 30 | " | 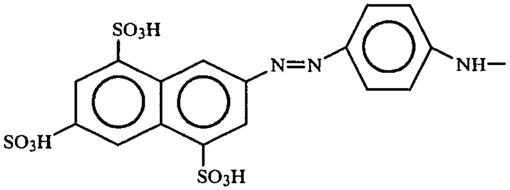 | " | b |
| 31 | " | 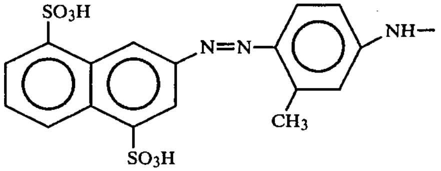 | " | b |
| 32 | " | 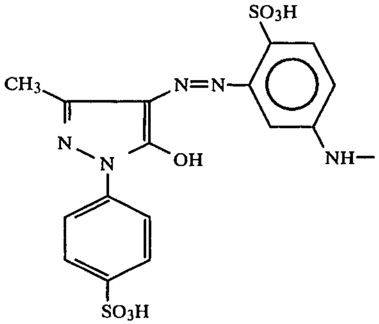 | " | b |

TABLE-continued
| | | | | |
|---|---|---|---|---|
| 33 | 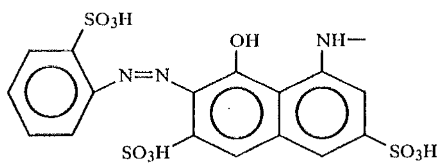 | 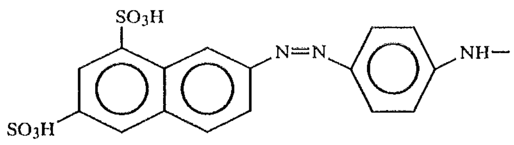 | $-HN-(CH_2)_6-NH-$ | b |
| 34 | " | " | $-HN-(CH_2)_3-NH-$ | b |
| 35 | 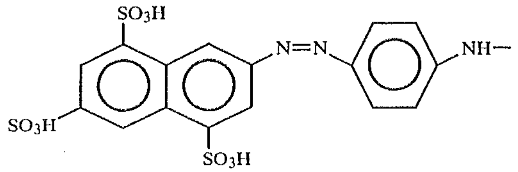 | 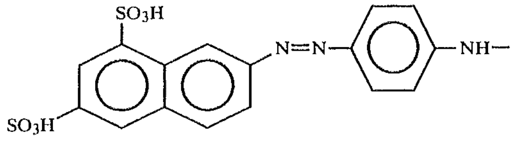 | $-NH-CH_2-\underset{OH}{\underset{\mid}{CH}}-CH_2-NH-$ | c |
| 36 | " | 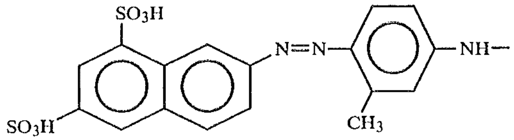 | " | c |
| 37 | " | 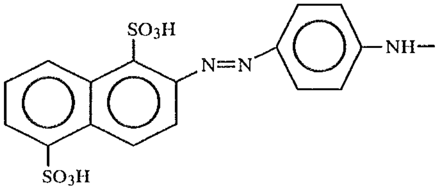 | " | c |
| 38 | " | 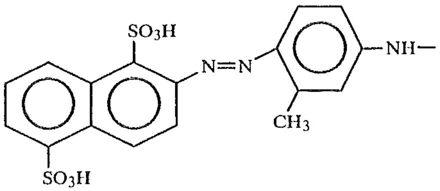 | " | c |

TABLE-continued
| | | | | |
|---|---|---|---|---|
| 39 | 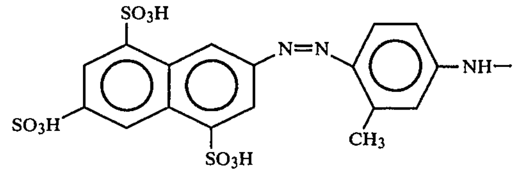 | 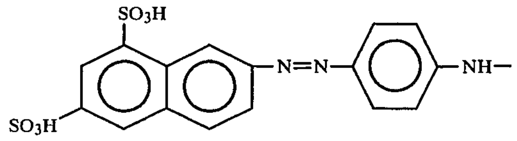 | $-NH-CH_2-\underset{OH}{\underset{\mid}{CH}}-CH_2-NH-$ | c |
| 40 | " | 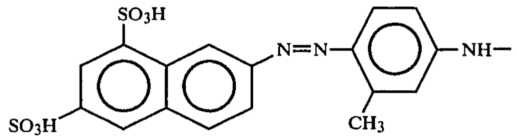 | " | c |
| 41 | " | 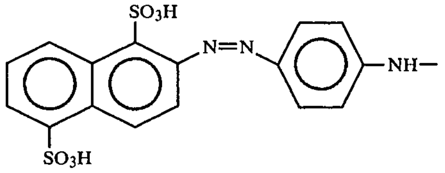 | " | c |
| 42 | " | 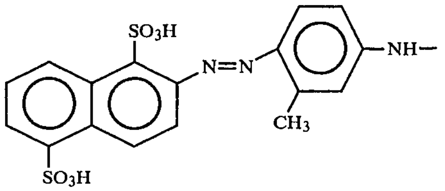 | " | c |
| 43 | 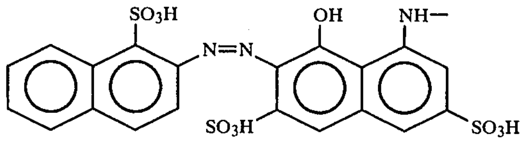 | 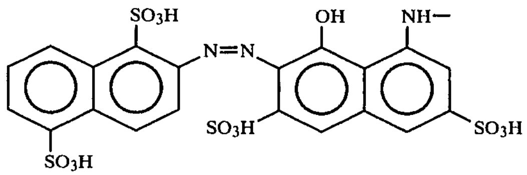 | " | d |
| 44 | " | 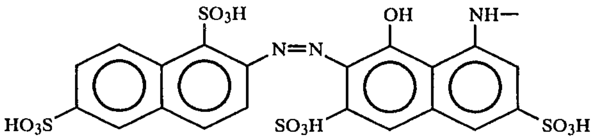 | " | d |

TABLE-continued
| Ex. No. | $D-NR_1-$ | $D'-NR_1-$ | $-NR_2-X-NR_3-$ | DS |
|---|---|---|---|---|
| 45 | 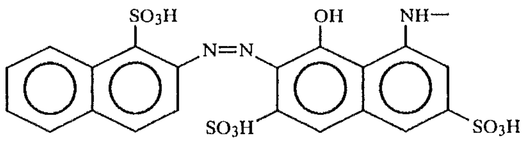 | 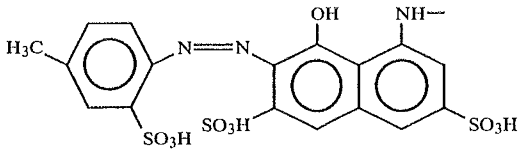 | $-NH-CH_2CH_2-N-$<br>$CH_2CH_2OH$ | d |
| 46 | " | 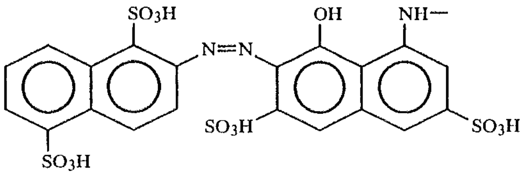 | $-NHCH_2CH_2CH_2NH-$ | d |
| 47 | " | " | $-NH-CH-CH_2-NH-$<br>$CH_3$ | d |
| 48 | " | " | $-N-CH_2CH_2CH_2-NH-$<br>$CH_3$ | d |
| 49 | " | " | $-NH-CH_2CH_2N-$<br>$CH_2CH_2OH$ | d |
| 50 | 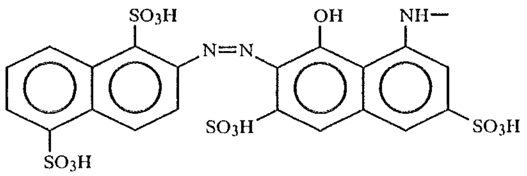 | 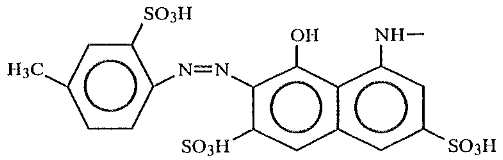 | " | d |
| 51 | 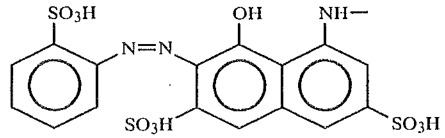 | 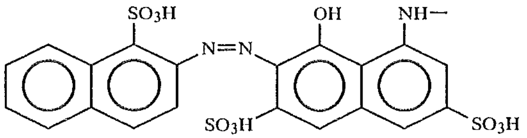 | $-NH-CH_2CH_2-N-$<br>$CH_2CH_2OH$ | d |

TABLE-continued
| | | | | |
|---|---|---|---|---|
| 52 | " | 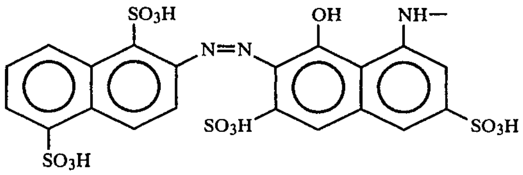 | " | d |
| 53 | 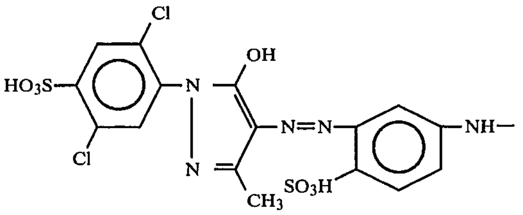 | 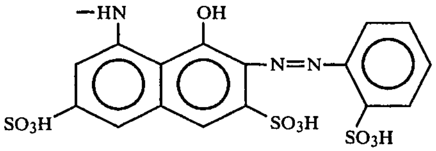 | $-NH(CH_2)_4NH-$ | d |
| 54 | 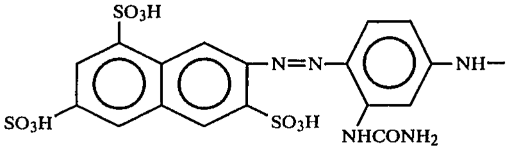 | 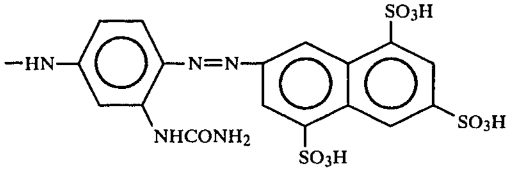 | $-NHCH_2CH(CH_3)NH-$ | a |

APPLICATION EXAMPLE

1 Part of the dye of Example 1 is dissolved in 300 parts water, 10 parts cotton are added to the dyebath and the temperature is raised to 80° in 10 minutes. 15 parts Glauber salts are added and, 30 minutes thereafter, 3 parts sodium carbonate. Dyeing is continued for 1 hour. Subsequently, the dyed material is rinsed cold and then hot. The dyeing is soaped at the boil for 20 minutes in 500 parts water and 0.5 parts sodium alkylsulphonate. After rinsing a scarlet dyeing with good light-, wet-, and chlorine-fastness is obtained.

What is claimed is:

1. A compound of the formula

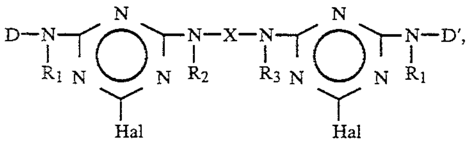

, or a salt thereof each cation of which is non-chromophoric, or a mixture of such compounds or salts, wherein each of D and D' is independently

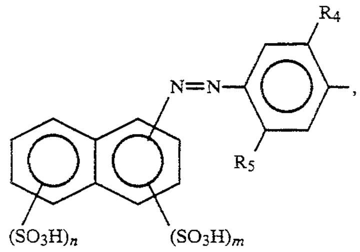

,

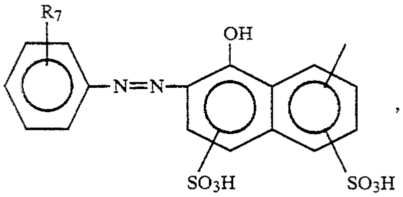

,

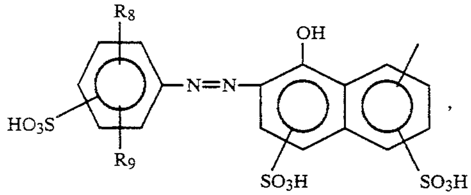

,

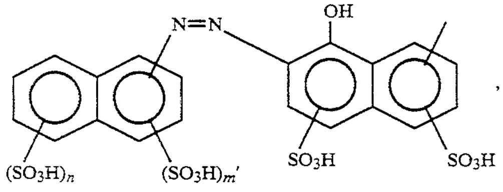

,

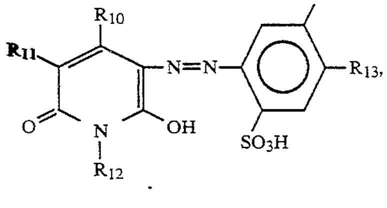

,

-continued

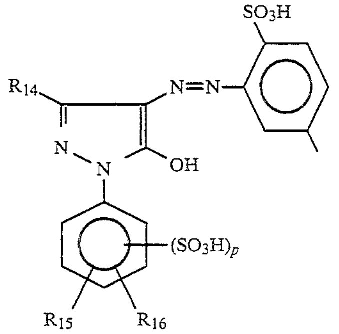

or

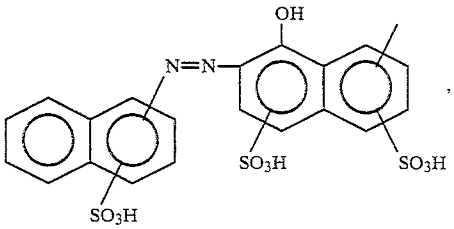

, wherein $R_4$ is hydrogen, $C_{1-4}$alkyl or $C_{1-4}$alkoxy, $R_5$ is hydrogen, $C_{1-4}$alkyl, $C_{1-4}$alkoxy or —NH—CO—$R_6$, wherein $R_6$ is $C_{1-4}$alkyl, —$NH_2$, —NH—$C_{1-4}$alkyl or —N($C_{1-4}$alkyl)$_2$, $R_7$ is hydrogen or $C_{1-4}$alkyl, $R_8$ is hydrogen or $C_{1-4}$alkyl, $R_9$ is hydrogen or sulfo, $R_{10}$ is hydrogent $C_{1-4}$alkyl, carboxy, phenyl or sulfomethyl, $R_{11}$ is hydrogent carboxy, sulfo, sulfomethyl or carbamoyl, $R_{12}$ is hydrogen, $C_{1-4}$alkyl or phenyl, $R_{13}$ is hydrogen or sulfo, with the provisos that at least one of $R_{10}$, $R_{11}$ and $R_{13}$ is sulfo or sulfomethyl and that $R_{11}$ is hydrogen, carboxy or carbamoyl when $R_{10}$ is sulfomethyl, $R_{14}$ is $C_{1-4}$alkyl or carboxy, each of $R_{15}$ and $R_{16}$ is independently hydrogen, $C_{1-4}$alkyl, chloro or bromo, each of m and m' is independently 0 or 1, each of n and n' is independently 1 or 2, with the provisos that m+n is 2 or 3, and m'+n' is 2, and p is 1 or 2, with the proviso that D and D' are different, each $R_1$ is independently hydrogen or $C_{1-4}$alkyl, each of $R_2$ and $R_3$ is independently hydrogen, $C_{1-4}$alkyl or 2-, 3- or 4-hydroxy($C_{2-4}$alkyl), X is linear or branched $C_{2-10}$alkylene, linear or branched $C_{3-10}$alkylene monosubstituted or disubstituted by hydroxy or linear or branched $C_{3-10}$alkylene monosubstituted or disubstituted by hydroxy and containing 1 or 2 radicals selected from —O— and —NRa—, with the proviso that any —O— or —NRa— radical is separated from any other such radical, each hydroxy group and the —$NR_2$— and —$NR_3$— radicals by at least two carbon atoms, wherein Ra is hydrogen or $C_{1-4}$alkyl, and each Hal is fluoro, chloro or bromo.

2. A compound according to claim 1, or a salt thereof each cation of which is non-chromophoric.

3. A compound according to claim 2, or a salt thereof each cation of which is sodium, lithium, potassium, ammonium, methylammonium, dimethylammonium, tetramethylammonium, triethylammonium, ethanolammonium, diethanoiammonium or triethanolammonium.

4. A compound according to claim 2, or a salt thereof each cation of which is non-chromophoric, wherein X is linear or branched $C_{2-10}$alkylene or linear or branched $C_{3-10}$alkylene monosubstituted or disubstituted by hydroxy.

5. A compound according to claim 4, or a salt thereof each cation of which is non-chromophoric, wherein X is linear or branched $C_{2-6}$alkylene or linear or branched $C_{3-6}$alkylene monosubstituted by hydroxy.

6. A compound according to claim 5, or a salt thereof each cation of which is non-chromophoric, wherein X is linear or branched $C_{2-6}$alkylene.

7. A compound according to claim 5, or a salt thereof each cation of which is non-chromophoric, wherein X is linear or branched $C_{3-6}$alkylene monosubstituted by hydroxy.

8. A compound according to claim 7, or a salt thereof each cation of which is non-chromophoric, wherein X is

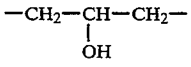
or
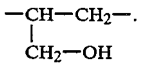
.

9. A compound according to claim 2, or a salt thereof each cation of which is non-chromophoric, wherein each $R_1$ is independently hydrogen, methyl or ethyl.

10. A compound according to claim 2, or a salt thereof each cation of which is non-chromophoric, wherein each of $R_2$ and $R_3$ is independently hydrogen, methyl, ethyl or 2-hydroxyethyl.

11. A compound according to claim 2, or a salt thereof each cation of which is non-chromophoric, wherein $R_4$ is hydrogen, methyl or methoxy, $R_5$ is hydrogen, methyl or —NH—CO—$R_6'$, wherein $R_6'$ is methyl, ethyl, —$NH_2$, —NH—$C_{1-2}$alkyl or —N($C_{1-2}$alkyl)$_2$, $R_7$ is hydrogen, $R_8$ is hydrogen, methyl or ethyl, $R_{10}$ is hydrogen or $C_{1-2}$alkyl, $R_{11}$ is hydrogen, sulfomethyl or carbamoyl, $R_{13}$ is hydrogen or sulfo, with the proviso that $R_{13}$ is hydrogen when $R_{11}$ is sulfomethyl and is sulfo when $R_{11}$ is hydrogen or carbamoyl, $R_{14}$ is methyl or carboxy, each of R15 and R16 is independently hydrogen, methyl or chloro, and p is 1.

12. A compound according to claim 2, or a salt thereof each cation of which is non-chromophoric, wherein $R_4$ is hydrogen when $R_5$ is hydrogen or —NH—CO—$R_6$ and is hydrogen or methoxy when $R_5$ is $C_{1-4}$alkyl.

13. A compound according to claim 2, or a salt thereof each cation of which is non-chromophoric, wherein each $R_1$ is hydrogen, $R_2$ is hydrogen, and $R_3$ is hydrogen.

14. A compound according to claim 13, or a salt thereof each cation of which is non-chromophoric, wherein each Hal is chloro.

15. A compound according to claim 14, or a salt thereof each cation of which is non-chromophoric, wherein X is linear or branched $C_{2-6}$alkylene.

16. The compound according to claim 15 having the formula

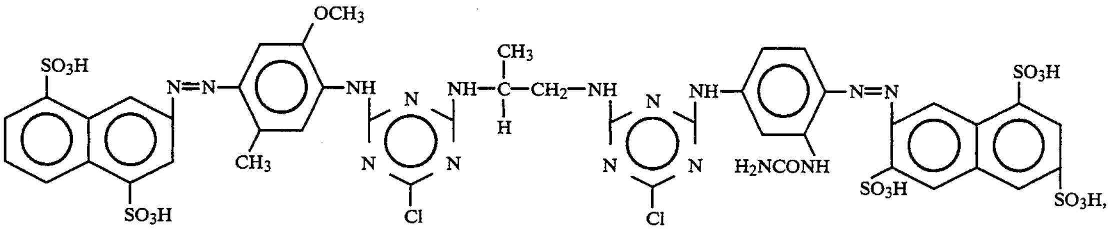

or a salt thereof each cation of which is non-chromophoric.

17. The compound according to claim 14 having the formula

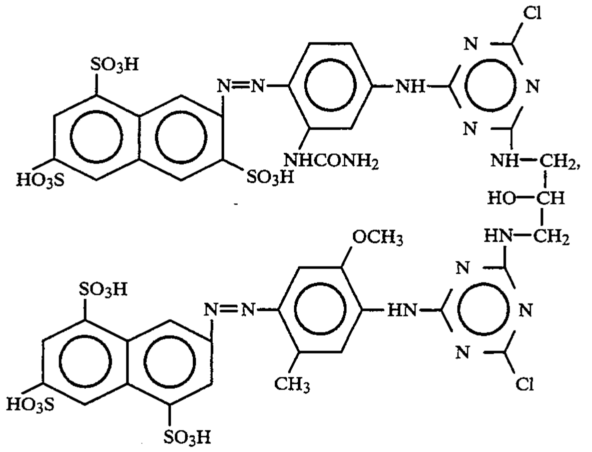

or a salt thereof each cation of which is non-chromophoric.

18. The compound according to claim 15 having the formula

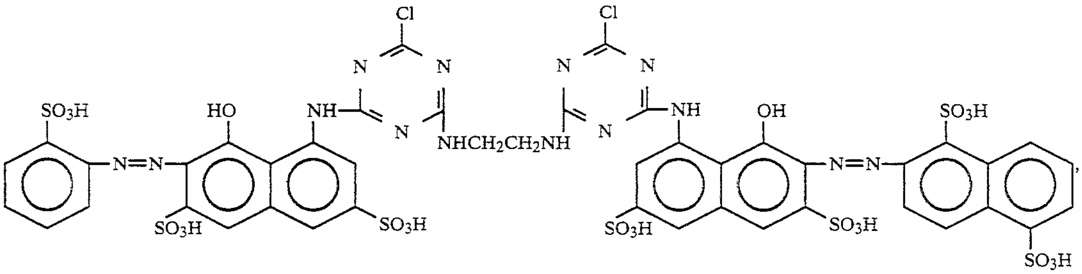
, or a salt thereof each cation of which is non-chromophoric.

19. The compound according to claim 15 having the formula

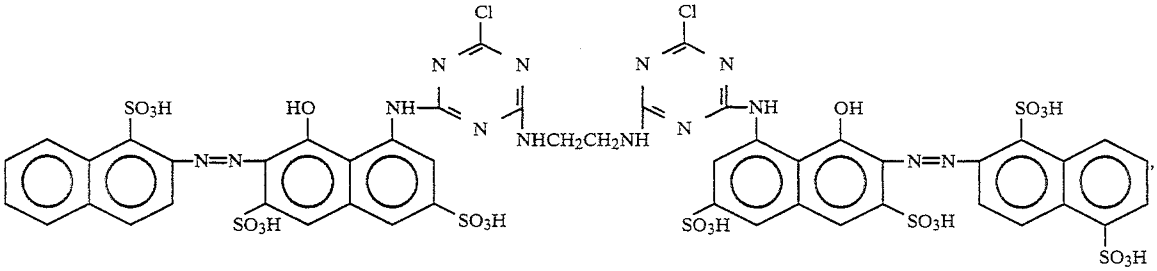
, or a salt thereof each cation of which is non-chromophoric.

20. A process for dyeing or printing a nitrogen-containing or hydroxy group-containing organic substrate comprising applying to a nitrogen-containing or hydroxy group-containing organic substrate a compound according to claim 1, a salt thereof each cation of which is non-chromophoric or a mixture of such compounds or salts, as dyeing or printing agent.

* * * * *